July 5, 1960 C. E. M. TIBBS 2,944,133

RADIO FREQUENCY DIELECTRIC HEATING APPARATUS

Filed Dec. 1, 1958 5 Sheets-Sheet 1

Inventor
Christopher E. M. Tibbs
By Ralph B. Stewart
Attorney

July 5, 1960 C. E. M. TIBBS 2,944,133

RADIO FREQUENCY DIELECTRIC HEATING APPARATUS

Filed Dec. 1, 1958 5 Sheets-Sheet 2

Inventor
Christopher E.M. Tibbs
By Ralph B. Stewart
Attorney

RADIO FREQUENCY DIELECTRIC HEATING APPARATUS

Filed Dec. 1, 1958 5 Sheets-Sheet 3

Inventor
Christopher E.M. Tibbs
By Ralph B. Stewart
Attorney

July 5, 1960 C. E. M. TIBBS 2,944,133

RADIO FREQUENCY DIELECTRIC HEATING APPARATUS

Filed Dec. 1, 1958 5 Sheets-Sheet 4

Inventor
Christopher E. M. Tibbs
By Ralph B. Stewart
Attorney

Inventor
Christopher E. M. Tibbs
By Ralph B. Stewart
Attorney

United States Patent Office 2,944,133

Patented July 5, 1960

2,944,133

RADIO FREQUENCY DIELECTRIC HEATING APPARATUS

Christopher E. M. Tibbs, Wokingham, England, assignor to Radio Heaters Limited

Filed Dec. 1, 1958, Ser. No. 777,495

Claims priority, application Great Britain Dec. 5, 1957

26 Claims. (Cl. 219—10.55)

This invention relates to generators for radio frequency dielectric heating apparatus and medical diathermy apparatus.

One of the major difficulties in constructing and using such apparatus is to keep the radiated harmonic interference at a low level. According to the present invention, this is achieved by including in the generator a cavity resonator having a concentrated electrical capacitance included within its outer screening shell, and an inner conductor unit of substantial overall cross-sectional dimensions, the cavity having an equivalent diameter which is at least 0.8 of its length, an oscillator valve entirely within a screened compartment all leads from which include radio frequency filters and which adjoins the cavity resonator or lies at least partly within the inner conductor of the cavity resonator, and a pick-up loop within the cavity having an output connection which passes through the wall of the cavity. The term "equivalent diameter" is intended to mean, in addition to the diameter of cavities of circular cross-section, the diameter of a circle having a cross-sectional area equal to that of the cavity when the cavity is not of circular cross-section.

The use of a cavity resonator having a capacitance wholly within a screened enclosure tends to reduce the strength of the harmonic frequencies but it is found that with a generator constructed in accordance with the invention, the harmonic radiation is considerably less than would be expected from a consideration of the calculated loaded Q of the cavity. It seems that with the combination of features according to the invention, the cavity acts to some extent as a low-pass filter and that this effect combines with the effect of the Q factor of the cavity to produce unexpectedly good suppression of harmonic radiation. The arrangement of the valve with respect to the cavity and the use of a pick-up loop as an output circuit for the cavity also tends to reduce the transfer of harmonic frequencies from the valve to the cavity and to reduce the amount of harmonic radiation picked up directly at the output. The arrangement also results in a generator having a high degree of frequency stability.

Preferably, the anode of the oscillator valve is connected to the rim of a capacitor plate within the cavity so that the risk of flash-over is reduced, and angular spacing between the anode feed to the cavity and the pick-up loop should also be made as large as possible.

The cavity generator according to the invention may be advantageously connected to a dielectric heating oven in which a conveyor is lead into and out of the oven through interference suppression ducts because the harmonic suppression characteristics of the cavity and interference suppression ducts are complementary. The ducts provide good attenuation of the harmonic frequencies as long as the maximum dimension across the duct is less than the critical frequency of the duct when it is considered as a waveguide. Thus in a typical case the ducts might provide good suppression of the fundamental and second harmonic waveforms, but poor suppression of the higher harmonics. The cavity resonator, on the other hand, gives very good attenuation of higher harmonics whilst its attenuation of the second harmonic is not so good, and there is no attenuation of the fundamental. The combination of the two therefore gives good attenuation of the interference radiation over the whole frequency range.

In order that the invention may be better understood, an example thereof will now be described, by way of example, with reference to the accompanying drawings, in which.

Figure 3:
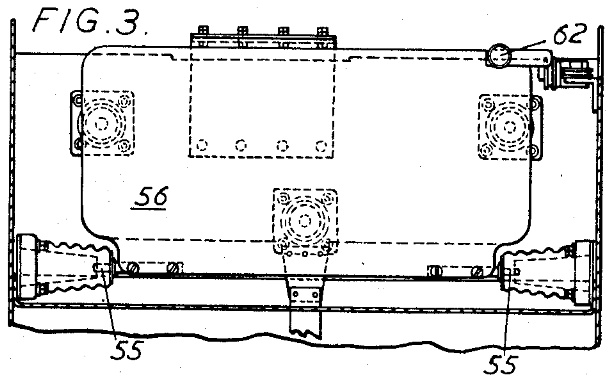
Figure 3 is an end view of the variable output capacitor shown in Figure 1.
Figure 4:
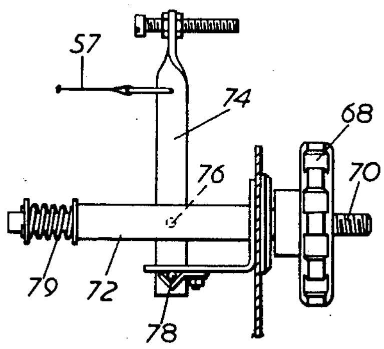
Figure 4 shows the control mechanism for adjusting the variable output capacitor.
Figure 5:
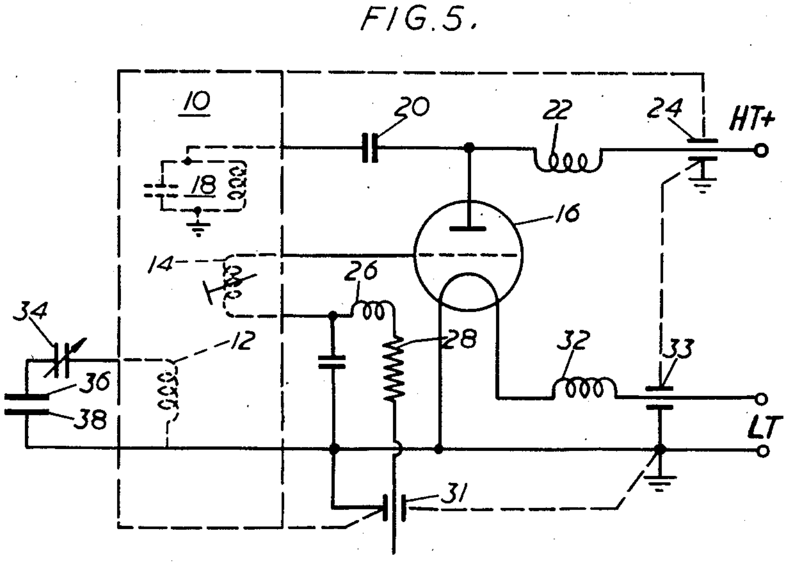
Figure 5 is a circuit diagram of the generator.

Figures 1 to 5 show a generator providing an output of 3 kilowatts at 36 megacycles. The circuit diagram of the generator is shown in Figure 5, in which the chain-dotted box 10 represents diagrammatically the cavity resonator, and in which the coil 12 represents the output pick-up loop, the coil 14 represents a grid coupling loop for the triode oscillator valve 16, and the coil-and-capacitor combination 18 represents the equivalent anode circuit, within the cavity, of the triode 16, the anode of which is connected to the cavity through the blocking capacitor 20. H.T. voltage for the anode is supplied through a choke 22, and the H.T. conductor passes through a lead-through capacitor 24. The grid return conductor also includes in series therewith a choke 26 and a resistor 28 which takes the form of four lamps, which ensure that the grid drive is not excessive when the oscillator runs off load, and passes through a lead-through capacitor 31. One side of the triode filament is connected to earth, whilst the other side is connected through a further choke 32 and a further lead-through capacitor 33 to one side of a transformer filament winding (not shown), the other side of which is connected to earth. The output coupling loop 12 also has one end effectively earthed within the cavity, the other end being connected through a variable capacitor 34 to the live electrode 36 which co-operates with an earthed electrode 38.

Figure 1:
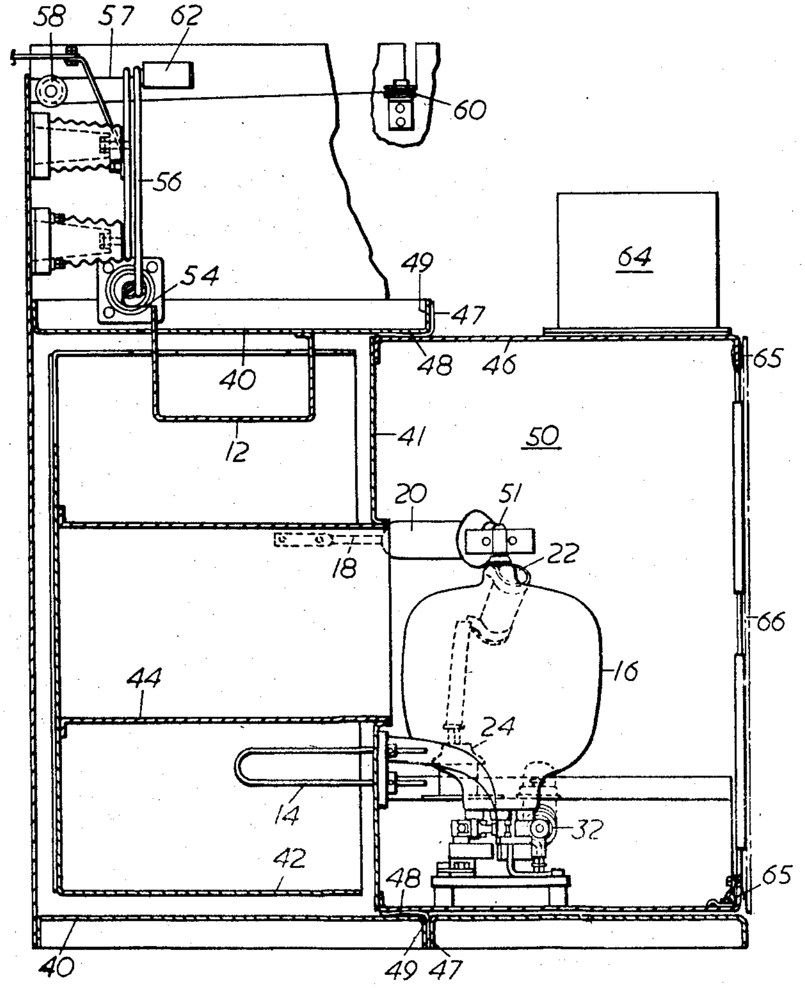
Figure 1 is a side view of the cavity resonator in cross-section and the adjacent compartment containing the oscillator triode.
Figure 2:
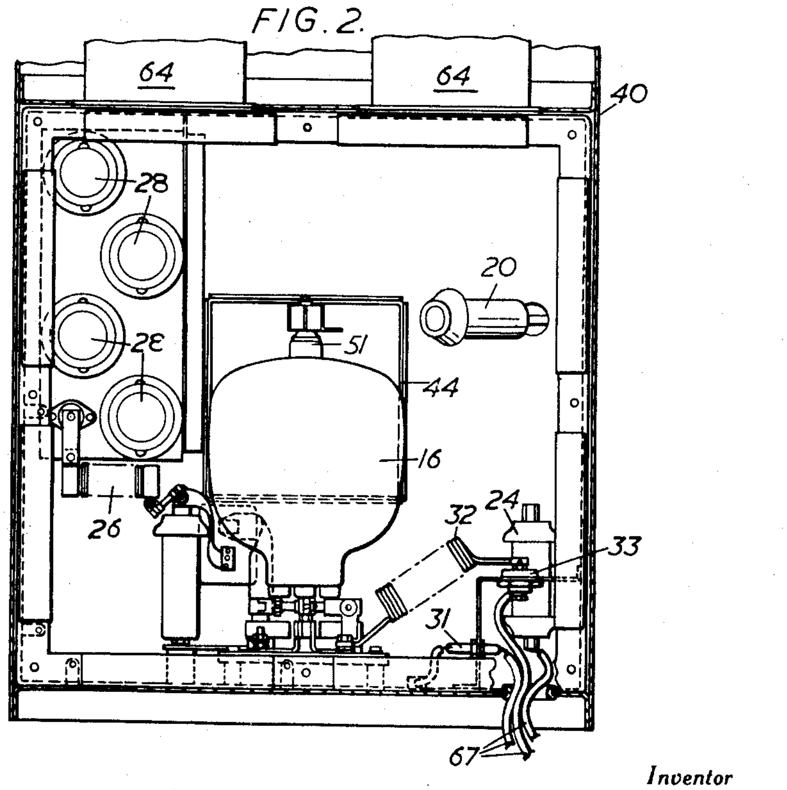
Figure 2 is an end view of the compartment containing the oscillator triode.

Figures 1 to 3 show the cavity resonator and its associated components, the cavity being shown in cross-section in Figure 1. It comprises an outer casing 40 closed at one end by a movable plate 41, an intermediate shell 42 spaced from the outer casing which is open at one end. The outer casing, intermediate shell and inner conductor are of square cross-section in a plane parallel to the plane of the open ends. The square open end of the inner conductor 44 can be seen in Figure 2. The other end of this conductor is connected to and closed by the end plate of the shell 42. The intermediate shell 42 forms with the end plate and side walls of the outer casing a capacitance which can be adjusted in value by axial sliding motion of the intermediate shell within the outer casing. The open end of the inner conductor 44 is electrically connected through the plate 41 and spring contact members 48 with the open end of the outer casing. The spring contact members take the form of contact strips the ends 47 of which are turned over and fixed in position relative to the flange 49 of the outer casing. The inner edge of each strip makes resilient contact with the side walls 46 extending from the plate 41. The plate 41 forms one end of a further compartment 50 within which the oscillator valve 16 is mounted and which slides with the inner conductor 44 and intermediate shell 42 when these are axially adjusted to vary the resonant frequency of the cavity. A movement of plus or minus one quarter of an inch will normally produce a sufficient variation in the end capacity of the cavity to vary the frequency enough to compensate for all variations in manufacturing tolerances. In a cavity operating at 40 megacycles, for example, such movement may produce a frequency variation of at least plus or minus one half megacycle. The anode 51 of the triode 16 is connected through the blocking capacitor 20 to one end of the anode feed lead 18, which has its other end connected to the rim of the intermediate shell. By connecting the anode to the cavity at this point, the risk of flash-over is greatly reduced and the stability of the generator is improved. The grid coupling loop 14 has one end directly connected to the grid terminal of the triode 16 and the other end connected through the choke 26 and the lamps 28 (Figure 2) to the lead-through capacitor 31.

The output pick-up loop 12 has one end fixed to and electrically connected to the outer shell 40. It extends into the space between the intermediate shell and the inner conductor and then emerges from the cavity and is connected through a flexible metal strip 54, to a movable plate 56 of a variable capacitor which is preferably screened and by means of which the output of the generator can be varied. As will be seen from Figures 1 and 3, the plate 56 is hinged about its lower edge by means of pivots 55 and its upper edge has connected thereto a cord 57 which passes round pulleys 58 and 60. A weight 62 on the movable plate ensures that it swings away from the fixed plate when the cord is slackened. Two fans 64 blow cooling air into the valve compartment, one end of which is closed by a perforated plate 66, which is screwed into position on the casing 46. The plate 66 is held in position by means of screws. Spring strips 65, which clip on to the inturned edges of the casing 46, are sprung outwardly on their outer sides and ensure that good electrical contact exists between the casing 46 and the perforated plate 66.

It will be seen that all the supply conductors 67 passing into the valve compartment 50 pass through R.F. filters consisting of a choke and a lead-through capacitor.

The outer shell 40 of the cavity has a cross-sectional outline which is a square of side 18 inches. The corresponding dimensions of the intermediate shell and the inner conductor are 16¾ inches and 6 inches. The ratio of the outer shell dimension to inner conductor dimension is thus 1:3, or in other words the cross-sectional area of the inner conductor is one ninth of that of the outer shell. The applicants have found that these relative dimensions result in a cavity of high Q and high efficiency. This is contrary to the view held hitherto and based on coaxial cable theory that the ratio of the outer shell "diameter" to inner conductor "diameter" should be 1:3.6 for maximum efficiency. The ratio of the width of the cavity to its length (which is 12 inches) is 1.5. A cavity of circular cross-sectional shape of equal cross-sectional area would have a diameter of about 20 inches and the ratio of diameter in length would be 1.67.

The cord 57 is associated with an output control 68, shown in Figure 4, on the front panel of the apparatus. The control is in the form of a knob which is mounted on a threaded rod 70 passing through a tubular support 72. A lever 74 passes through slots in the rod 70 and support 72, and a pin 76 passes transversely through the threaded rod 70 and the lever 74, which is pivoted at 78. The free end of the lever 74 is connected to the cord 57. Rotation of the control 68 moves the threaded rod longitudinally within the tubular support and swings the lever 74 about its pivot 78. Clockwise rotation of the control 68 causes movement of the threaded shaft to the left in the drawing, against the spring 79. During anticlockwise rotation, the spring pulls the threaded shaft to the right.

Tests on a plastic welding unit employing the cavity described above gave the following results, the figures given representing the interference radiated at a distance of 10 metres:

| | | |
|---|---|---|
| Fundamental | milli-volts per metre | 700 |
| 2nd Harmonic | do | 17 |
| 3rd Harmonic | micro-volts per metre | 10.5 |
| 4th Harmonic | do | 56 |
| 5th Harmonic | do | 21 |
| 6th Harmonic | do | 45 |

In a typical equipment of the kind used hitherto, the corresponding figures were:

| | Milli-volts per metre |
|---|---|
| Fundamental | 700 |
| 2nd Harmonic | 300 |
| 3rd Harmonic | 3.4 |
| 4th Harmonic | 320 |
| 5th Harmonic | 7 |
| 6th Harmonic | 18 |

These figures show that the cavity which has been described enables a great reduction in the amplitude of radiated harmonic frequencies to be achieved and therefore reduces the necessity for employing further circuits, between the cavity and the final load, discriminating against the harmonics. This reduction is believed to be due to the combination of the completeness of the screening, the high Q of the cavity resonator, and the use of an output pick-up coil. If desired, the radiation of second harmonic interference can be further suppressed by adding a simple second harmonic filter in the output circuit of the equipment.

This reduction in harmonic interference radiation is achieved with a relatively short cavity, although it had previously been thought that a long and narrow cavity was helpful in securing good harmonic suppression. The applicants have found in long and narrow cavities the inner conductor tends to overheat and this leads to poor frequency stability and inefficient working. Moreover, the harmonic radiation at the output seems to be excessive, making it necessary to employ a coaxial line output feeding into a separate H.F. output transformer with isolated primary and secondary windings. Furthermore, it does not seem possible to obtain such a high degree of suppression of the large harmonics in a cavity of such small overall dimensions (without the use of additional filters for the higher harmonics) unless the inner conductor is of substantial overall cross-sectional dimensions.

It is found that the use of a simple variable capacitor of the kind described connected to the output pick-up loop does not cause excessive harmonic radiation, and that the cavity generator unit described maintains a frequency within ± 0.6% of the frequency of operation. If desired, however, a differential capacitor arranged to maintain constant the capacitance across the electrode circuit may be used.

The small size of the cavity resonator which has been described, and which is intended for a 3 kilowatt equipment, makes it possible to accommodate the generator underneath the work table of a plastic sheet welder, as in the case of a generator unit of conventional design. Moreover, it can be extended to generators of much higher output, for example an output of 30 kilowatts, without becoming prohibitively large. The output circuit is sufficiently tightly coupled to permit the very large value of circulating kilowatt-amperes which would be required to supply an output of 30 kilowatts. The high value of circulating kilovolt amperes in the cavity described makes the frequency stability of a generator employing such a cavity much better than that of a generator having a conventional resonant circuit.

In an alternative form of the invention, the inner conductor unit of the cavity resonator is provided with corrugations or other irregularities to increase its ability to carry currents at high frequencies. Alternatively it may be in the form of a number of parallel strips, rods or wires (for example Litz wire) extending from end to end of the cavity and preferably arranged to form a cylinder.

If desired, balanced electrodes can be connected to the cavity output by using an output pick-up loop neither side of which is joined to earth. The ends of the pick-up loop can be connected to the two dielectric heating electrodes either directly or through two series tuning capacitors.

In a further form of the invention, provision is made for adding extensions to the intermediate shell to vary the effective capacitance of the cavity. These extensions may be mounted by means of pins and slots so that their positions with respect to the intermediate shell can be adjusted.

Figure 6:
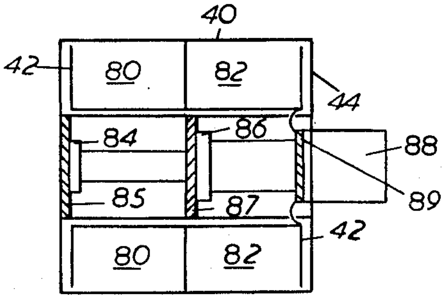
Figure 6 shows diagrammatically a further form of the invention with the valve partly within the cavity.

Different parts of the cavity tank circuit may be made of different metals to balance out the changes in capacitance and inductance as the cavity warms up and expands. For example, the inner tube might be made of copper and the outer shell of brass.

Where an output power of more than 5 kilowatts is required, it is advantageous to mount two cavities of the kind described above in a back-to-back arrangement, as shown diagrammatically in Figure 6, in which the two cavities are indicated by the reference numerals 80 and 82. This is particularly useful at high frequencies, for example frequencies of the order of 400 mc./s. The double cavity then has a complete outer casing, for example in the form of a box, with an inner conductor 44 running from one end to the other. The outer casing and inner conductor may constitute one electrode of the electrical capacitance within the cavity, and the second electrode may then consist of an intermediate member 42 surrounding the inner conductor and terminating in two plates parallel to the end plates of the outer casing of the cavity. In the embodiment shown, a coaxial seal oscillator valve is mounted with its cathode 84 and grid 86 lying within the inner conductor of the double cavity and its projecting anode 88 connected through a blocking capacitor 89 to the live end plate of the cavity. The grid 86 is jointed to the centre point of the intermediate conductor 42 of the double cavity again via a suitable blocking condenser 87. The cathode 84 of the coaxial seal oscillator valve is connected to the outer shell at the point where it connects with the inner conductor of the cavity, again through a suitable capacitor 85.

A suitable capacitor at the very high frequencies involved can be formed, for example, by two flat plates separated by a dielectric of polytetrafluoroethylene.

Figure 7:
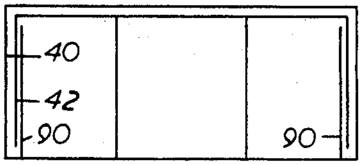
Figures 7, 8, 9 and 10 show cavities containing multiple condenser plates.
Figure 8:
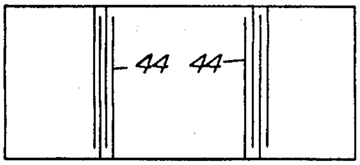
Figure 9:
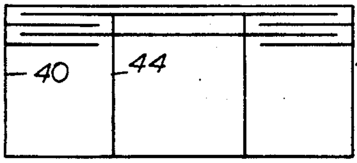
Figure 10:
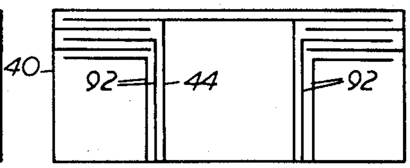

The concentrated capacitance may include more than two plates. Referring to Figure 7, in a cavity in which the side wall of the outer casing 40 constitutes one of the plates and the intermediate shell 42 constitutes the second plate, a further plate 90 electrically connected to the outer casing is arranged within and adjacent to the intermediate shell; or the inner conductor may consist of a plurality of separate plates, as in Figure 8, the plates being connected alternately to opposite end plates of the cavity the multiple-plate unit constituting both the inner conductor and a concentrated electrical capacitance within the cavity; or again a plurality of flat plates may lie parallel to and adjacent to one end of the cavity, as in Figure 9, with alternate ones connected to the outer casing 40 and the remaining ones connected to the inner conductor 44, or to a series of shells 92 surrounding the inner conductor, as in Figure 10. The inner conductor may consist of a plurality of flat plates connected alternately to opposite ends of the cavity instead of the coaxial plates shown in Figure 8.

Figure 11:
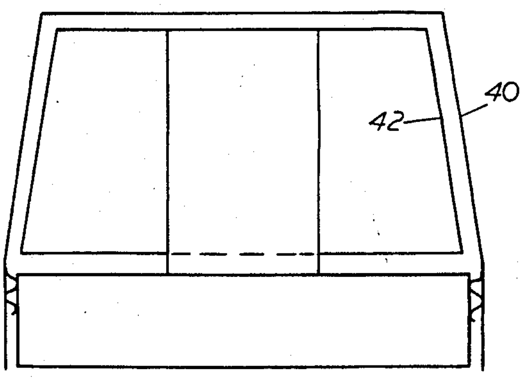
Figure 11 shows a cavity having tapered sides.

Figure 11 shows an embodiment of the invention in which a greater change in the concentrated electrical capacitance and therefore of the resonant frequency of the cavity for a given degree of relative axial motion between the outer casing and the intermediate shell is obtained by giving to the outer casing 40 and the intermediate shell 42 a taper (for example, at an angle of 10°) extending from one end to the other. Then the relative axial motion will vary the spacing between the sides of the outer casing 40 and intermediate shell 42, as well as the spacing between their end walls. This permits much greater standardisation of equipment, since units can be tuned to different frequencies on site, for example to avoid local television frequencies. It is also possible to vary the resonant frequency of the cavity by moving the end plate of the outer casing axially with respect to the inner assembly, comprising the intermediate shell and the inner conductor.

Figures 12, 13, 14:
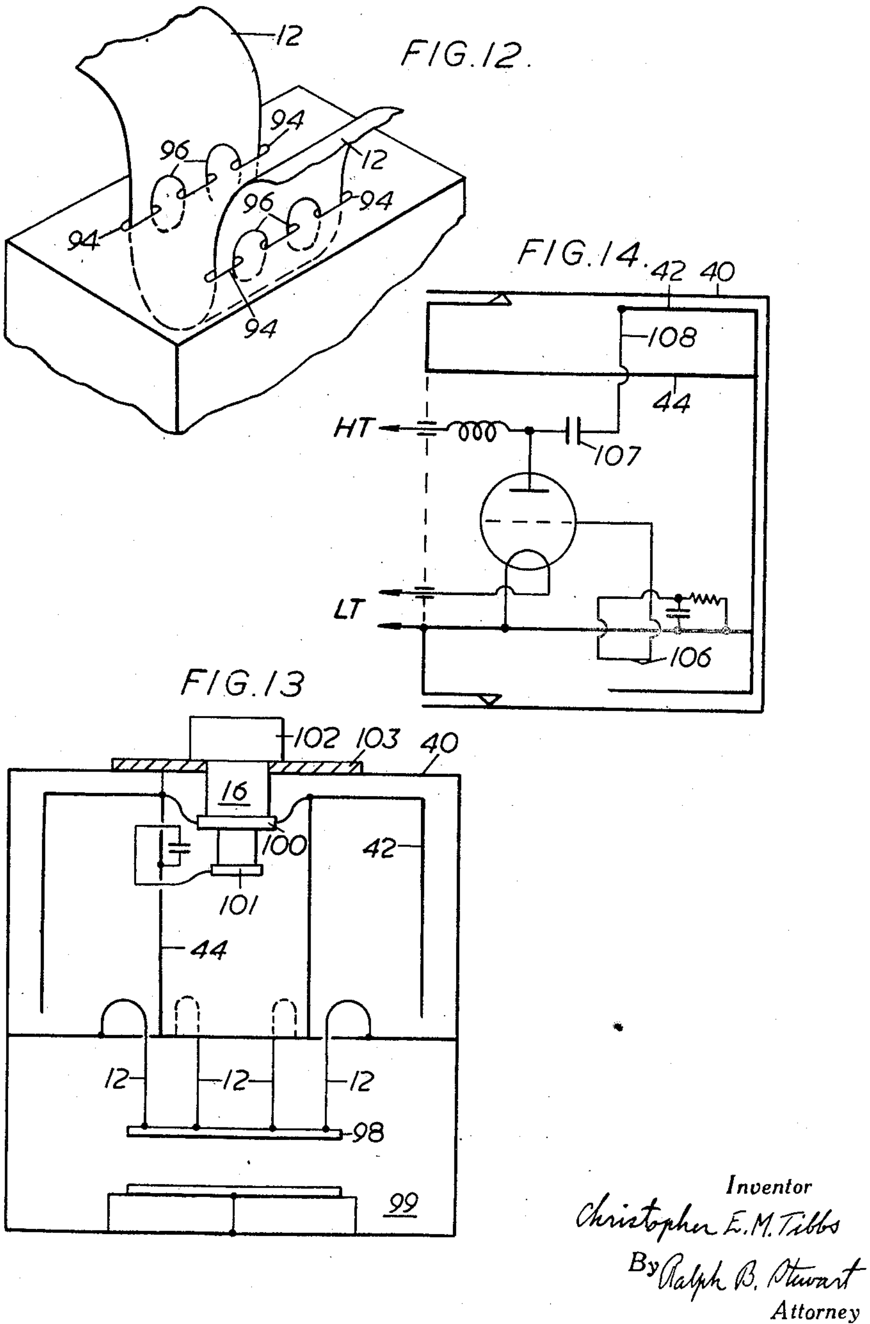
Figure 12 illustrates a method of bringing a wide pick-up loop through a wall of the cavity.
Figure 13 shows a cavity mounted directly above an oven.
Figure 14 shows diagrammatically an oscillator valve and associated components arranged wholly within a cavity resonator.

If a heavy current has to be carried by the pick-up coil of the resonator, it may be necessary to use a very wide coil. The length of one side of a resonator of oblong cross-section suitable for very high values of circulating kilovolt-amperes may be as much as two feet, while the diameter of the pick-up loop may be only 3 inches. A pick-up coil of 12 inch width could not be passed through a single slot in the wall of the cavity without very severely disturbing the electrostatic field distribution inside the cavity and thus lowering its Q, which in turn results in a reduction both of its stability and its ability to suppress harmonies. As shown in Figure 12, to overcome this difficulty, the applicants replace each of the two long slots in the cavity wall through which pass the two sides of the pick-up loop by a series of short slots 94, and form a transverse row of slots 96 in each side of the pick-up loop where it is to pass through the cavity wall. The strips between the slots in each side of the pick-up loop pass through the slots in the cavity wall. If desired, the part of the pick-up coil which enters the cavity resonator may take the form of a series of separate pick-up coils of narrow strip metal, each strip passing through its own pair of slots 94 on entering and leaving the cavity. Outside the cavity, the separate strips are joined in parallel at each end to a broad strip conductor. One end of the pick-up coil may be earthed.

If the cavity is to be used at very high frequencies, for example of the order of 200 mc./s., the arrangement of Figure 13 can be used. In Figure 13, an electrode 98 mounted directly under the cavity can be fed at a number of points distributed over its surface from a number of pick-up coils 12 distributed around the inner conductor 44 of the cavity. By feeding the electrode at a number of points in this manner, its size can be increased without rendering the voltage distribution over the electrode too uneven. The electrode may be part of a dielectric heating oven 99. A coaxial seal oscillator valve 16 can be mounted with its grid 100 and cathode 101 within the inner conductor 44 and its anode 102 through a blocking capacitor 103 connected to the centre of the end plate of the outer shell 40. The grid is connected to the centre of the end plate of the intermediate shell 42.

This idea can be extended still further, and in another embodiment of the invention, shown diagrammatically in Figure 14, the oscillator valve is mounted wholly within the inner conductor. This arrangement makes for more effective use of the space occupied by the generator, and leads to higher efficiency because of the reduction in standing losses, that is to say, in the anode current drawn under no-load conditions. The intermediate shell 42, which forms with the outer casing 40 the concentrated electrical capacitance, consists of an end plate and side walls which extend only about half way along the outer casing. One of the filament leads is electrically connected to the inner conductor close to the open end of the inner conductor, and the control grid of the oscillator is connected to a pick-up loop 106 which passes through the central tube into the space between the latter and the outer casing. The other end of the pick-up loop returns through the wall of the inner conductor and is connected to the latter by a capacitor and a resistor in parallel. The anode is connected through a blocking capacitor 107 to a conductor 108 which passes through the inner conductor 44 and is connected to the rim of the intermediate shell 42. The beneficial results obtained by placing the valve within the inner conductor of the cavity were not obvious because it had not previously been realised that the inner surface of the inner conductor is at a substantially steady potential although the outer side carries heavy currents. In one example, the outer casing had a square cross-section of width 21 inches, and had a length of 7 inches. The inner conductor in which the valve was mounted, had a square cross-section of width 10 inches. This unit oscillated at 55 megacycles with a high efficiency.

The use of a polystyrene-foil capacitor as the inner member of the cavity will be of great assistance in producing higher values of kva. and higher values of Q for the cavity when the cavity has to be energised from a valve operating at a low H.T. voltage, (for example, 1000 volts), or where the size of the cavity would otherwise become prohibitively large owing to its low operating frequency (for example, on wood-glueing equipment operating at 5 mc./s.). The use of a polystyrene-foil capacitor in the centre of the cavity permits the current-carrying inductive part of the cavity to be larger in diameter than is possible if the centre limb of the cavity has to be the inductive limb.

The frequency stability of the generator can be improved by applying its output to a phase or frequency discriminator and by adjusting the tuning of the cavity resonator in accordance with the output of the discriminator. To improve the stability still further, the oscillator valve can be crystal controlled, and the oscillator signal and the signal from the cavity resonator can be compared in the discriminator.

Figure 15:
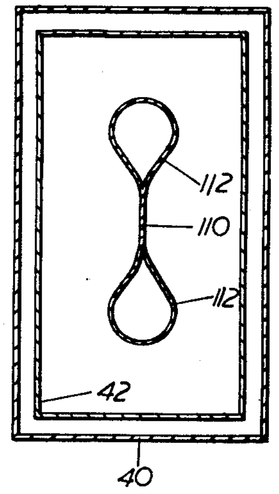
Figure 15 shows a cross-section through a rectangular cavity having an alternative form of inner conductor.

The cross-section of the outer casing of the cavity at right angles to the longitudinal axis of the inner conductor can be of elongated rectangular shape, if desired. A cavity of this general shape is shown in Figure 15, in which the outer casing 40 closely encloses an intermediate shell 42 which forms the second electrode of the internal capacitance. The inner conductor has a central portion 110 of sheet form, the longitudinal edges of the centre portion being extended by lateral portions 112 of pear-shaped cross-section.

I claim:

1. R.F. dielectric heating apparatus or medical diathermy apparatus including a cavity resonator having an outer screening shell and a hollow inner conductor unit of substantial overall cross-sectional dimensions connected at one end to an end wall of the shell and free at the other end and forming an electrode of a concentrated electrical capacitance included within said outer screening shell, said cavity having an equivalent diameter which is at least 0.8 of its length, said apparatus further comprising a screened compartment adjoining the cavity resonator, an oscillator tube entirely within the screened compartment, a loop within the cavity coupling the cavity to the grid circuit of the oscillator, means coupling the anode of the tube to the inner conductor, power supply leads for the tube extending externally of the compartment and radio-frequency filters connected to the leads, and an output pick-up loop within said cavity having an output connection which passes through the outer shell of said cavity and connected to partially screened operating electrodes external to the cavity.

2. Apparatus according to claim 1, in which the anode of said oscillator tube is coupled to the free end of the inner conductor.

3. Apparatus according to claim 2, in which said outer shell constitutes one of the electrodes of said electrical capacitance within the cavity and in which the other electrode of said capacitance is formed by said inner conductor unit having an end wall and side walls mounted within and closely adjacent to the end and side walls of said outer shell respectively, the anode of said oscillator tube being coupled to the rim of the side wall of said inner conductor unit remote from its end wall.

4. Apparatus according to claim 3, in which said pick-up loop is on the opposite side of the cavity from the point at which the cavity is coupled to the anode of said oscillator tube.

5. Apparatus according to claim 1 in which said output pick-up loop is connected to a dielectric heating oven provided with harmonic radiation suppression ducts.

6. Apparatus according to claim 1 including a plurality of separate output pick-up loops electrically connected in parallel.

7. Apparatus according to claim 1, for radio frequency dielectric heating, in which the ends of said output pick-up loop are connected through apertures in said outer shell of the cavity to balanced heating electrodes.

8. Apparatus according to claim 1, in which said inner conductor has a cross-sectional area which is at least one-ninth of the cross-sectional area of the said outer shell.

9. Apparatus according to claim 1, in which said inner conductor unit is formed by a plurality of parallel conductors extending from end to end of said cavity resonator.

10. Apparatus according to claim 1, in which said inner conductor unit takes the form of a dielectric capacitor having a dielectric of a material of low electrical loss factor.

11. Apparatus according to claim 10, in which said inner conductor unit is a rolled polystyrene-dielectric capacitor.

12. Apparatus according to claim 1, in which two of said cavity resonators are mounted back to back.

13. R.F. dielectric heating apparatus or medical diathermy apparatus including a cavity resonator having an outer screening shell and a hollow inner conductor unit of substantial overall cross-sectional dimensions and connected at one end to an end wall of the shell and free at the other end and forming an electrode of a concentrated electrical capacitance included within said outer screening shell, said cavity having an equivalent diameter which is at least 0.8 of its length, said apparatus further comprising a screened compartment adjoining the cavity resonator, an oscillator tube entirely within the screened compartment, a loop within the cavity coupling the cavity to the grid circuit of the oscillator, means coupling the anode of the tube to the inner conductor, power supply leads for the tube extending externally of the compartment and radio-frequency filters connected to the leads, an output pick-up loop within said cavity having an output connection which passes through the outer shell of said cavity and connected to partially screened operating electrodes external to the cavity, said concentrated electrical capacitance within the cavity being adjustable for tuning of the latter.

14. Apparatus according to claim 13, in which the outer shell of the cavity, constituting one of the electrodes of said concentrated electrical capacitance, and said inner conductor unit constituting the second electrode of said capacitance being mounted for relative axial sliding movement with respect to an end wall of the shell.

15. Apparatus according to claim 14, in which the outer shell of said cavity tapers from one end to the other, and in which the second electrode of said concentrated electrical capacitance includes a side wall having a similar taper, so that relative axial motion of said outer shell and said second electrode causes a change in the spacing between their side walls.

16. Apparatus according to claim 13, in which the output of said cavity is applied to a phase or frequency discriminator, the output of which is used to control the tuning of said cavity in order to improve the frequency stability of the generator.

17. R.F. dielectric heating apparatus or medical diathermy apparatus including two cavity resonators each having an outer screening shell, a hollow inner conductor of substantial overall cross-sectional dimensions, a concentrated electrical capacitance included within said outer screening shell and a pick-up loop within said cavity having an output connection which passes through the outer shell of said cavity, and each having an equivalent diameter (as herein defined) which is at least 0.8 of its length, said two cavity resonators being mounted back to back with their inner conductors in alignment, said apparatus further comprising an oscillator tube entirely within a screened compartment all leads from which include radio-frequency filters, said screened compartment including the volume defined within said aligned hollow inner conductors and said tube lying at least partly within said inner conductors.

18. Apparatus according to claim 17, in which the oscillator tube and the associated components of the oscillator circuit are mounted wholly within the aligned inner conductors of said two cavities.

19. R.F. dielectric heating apparatus or medical diathermy apparatus including a cavity resonator having an outer screening shell and a hollow inner conductor unit of substantial overall cross-sectional dimensions connected at one end to an end wall of the shell and free at the other end and forming an electrode of a concentrated electrical capacitance included within said outer screening shell, said cavity having an equivalent diameter which is at least 0.8 of its length, said apparatus further comprising a screened compartment adjoining the cavity resonator, an oscillator tube entirely within the screened compartment a loop within the cavity coupling the cavity to the grid circuit of the oscillator, means coupling the anode of the tube to the inner conductor, power supply leads for the tube extending externally of the compartment and radio-frequency filters connected to the leads, said screened compartment including the volume defined within said hollow inner conductor and said tube lying at least partly within said inner conductor, and an output pick-up loop within said cavity having an output connection which passes through the outer shell of said cavity and connected to partially screened operating electrodes external to the cavity.

20. Apparatus according to claim 19, in which said oscillator tube and the associated components are mounted wholly within the inner conductor of said cavity.

21. R.F. dielectric heating apparatus or medical diathermy apparatus including a cavity resonator having an outer screening shell, an inner conductor unit of substantial overall cross-sectional dimensions and a concentrated electrical capacitance included within said outer screening shell, said cavity having an equivalent diameter (as herein defined) which is at least 0.8 of its length, said apparatus further comprising an oscillator tube entirely within a screened compartment all leads from which include radio-frequency filters and which adjoins the cavity resonator or lies at least partly within the inner conductor of the cavity resonator, and a pick-up loop of wide metal strip within said cavity, said strip being formed to define a transverse row of holes where the strip is to pass through the outer shell of said cavity, and said outer shell being formed to define a corresponding transverse row of holes through which pass the parts of the strip between the holes in the latter.

22. R.F. dielectric heating apparatus or medical diathermy apparatus including a cavity resonator having an outer screening shell and an inner conductor unit of substantial overall cross-sectional dimensions and a pick-up loop within the cavity having an output connection which passes through said outer shell, and connected to partially screened operating electrodes external to the cavity, said inner conductor connected at one end to an end wall of the shell and free at the other end and forming an electrode of a concentrated electrical capacitance included within said outer screening shell, at least a part of said capacitance being provided by the side walls of the outer shell of the cavity and said inner conductor mounted within and close to said side walls, said cavity having an equivalent diameter which is at least 0.8 of its length, said apparatus further comprising a screened compartment adjoining the cavity resonator, an oscillator tube entirely within said screened compartment, power supply leans connected to the tube extending externally of the compartment and radio-frequency filters connected to the leads.

23. Apparatus according to claim 22, in which said inner electrode of said concentrated electrical capacitance is provided by conductive members mounted on said inner conductor and closely adjacent to both the end and the side walls of said outer shell of said cavity resonator.

24. Apparatus according to claim 23, in which lateral conductive members of said inner electrode of said concentrated electrical capacitance are provided with means for mounting thereon extension plates to vary the effective capacitance of said cavity.

25. Apparatus according to claim 22, in which the inner conductor unit consists of a central portion having parallel sides and two lateral portions extending from the longitudinal edges of said centre portion, said lateral portions having a pear-shaped cross-sectional form.

26. R.F. dielectric heating apparatus or medical diathermy apparatus including a cavity resonator having an outer screening shell, an inner conductor unit which is of substantial overall cross-sectional dimensions and which consists of a plurality of separate substantially coextensive longitudinally extending conductors which are connected alternately to opposite end plates of said outer shell, whereby said inner conductor unit constitutes at least a part of a concentrated electrical capacitance, the equivalent diameter of said cavity being at least 0.8 of its length, said apparatus further comprising a screened compartment adjoining the cavity resonator, an oscillator tube entirely within the screened compartment a loop within the cavity coupling the cavity to the grid circuit of the oscillator, means coupling the anode of the tube to the inner conductor, power supply leads for the tube extending externally of the compartment and radio-frequency filters connected to the leads, and an output pick-up loop within said cavity having an output connection which passes through the wall of said cavity and connected to partially screened operating electrodes external to the cavity.

References Cited in the file of this patent

UNITED STATES PATENTS

| | | |
|---|---|---|
| 2,732,473 | Ellsworth | Jan. 24, 1956 |
| 2,783,344 | Warren | Feb. 26, 1957 |
| 2,868,939 | Pound | Jan. 13, 1959 |